US012092770B2

(12) United States Patent
Beaulieu, Jr. et al.

(10) Patent No.: US 12,092,770 B2
(45) Date of Patent: Sep. 17, 2024

(54) SYSTEM AND APPARATUS FOR DETERMINING A VEHICLE CENTERLINE

(71) Applicant: Honda Motor Co., Ltd., Tokyo (JP)

(72) Inventors: Douglas Mitchell Beaulieu, Jr., Sunbury, OH (US); Eric L Ellington, Marysville, OH (US); Ryan C. Hetzer, Bellefontaine, OH (US)

(73) Assignee: Honda Motor Co., Ltd., Tokyo (JP)

( * ) Notice: Subject to any disclaimer, the term of this patent is extended or adjusted under 35 U.S.C. 154(b) by 890 days.

(21) Appl. No.: 17/174,547

(22) Filed: Feb. 12, 2021

(65) Prior Publication Data

US 2022/0260696 A1 Aug. 18, 2022

(51) Int. Cl.
*G01S 7/497* (2006.01)
*G01S 13/931* (2020.01)
*G01S 17/931* (2020.01)

(52) U.S. Cl.
CPC .......... *G01S 7/4972* (2013.01); *G01S 13/931* (2013.01); *G01S 17/931* (2020.01); *G01S 2013/93271* (2020.01)

(58) Field of Classification Search
None
See application file for complete search history.

(56) References Cited

U.S. PATENT DOCUMENTS

| 4,615,618 | A | 10/1986 | Bailey et al. |
| 4,918,821 | A | 4/1990 | Bjork |
| 5,644,854 | A * | 7/1997 | Bergeron ............... B21D 1/14 33/608 |
| 7,424,387 | B1 | 9/2008 | Gill et al. |
| 7,874,078 | B2 | 1/2011 | Harrill et al. |
| 9,182,477 | B2 | 11/2015 | Jones et al. |
| 11,947,051 | B2 * | 4/2024 | Newkirk ............. H04N 17/002 |
| 2015/0020586 | A1 * | 1/2015 | Kerestan ................ G01M 9/02 73/147 |
| 2018/0100783 | A1 | 4/2018 | Stieff et al. |
| 2020/0400782 | A1 | 12/2020 | Tang et al. |
| 2021/0018629 | A1 * | 1/2021 | Kohn .................... G01S 7/4026 |

FOREIGN PATENT DOCUMENTS

| CN | 204944852 U | 1/2016 |
| CN | 103909865 B | 5/2016 |
| CN | 107918114 A | 4/2018 |
| CN | 108710120 A | 10/2018 |
| CN | 208520987 U | 2/2019 |
| CN | 109932693 A | 6/2019 |

(Continued)

*Primary Examiner* — Luke D Ratcliffe
(74) *Attorney, Agent, or Firm* — Mark Duell; American Honda Motor Co., Inc.

(57) ABSTRACT

A system determines a centerline of a vehicle to adjust a forward aim of a camera or ranging unit. The vehicle has a forward axle transverse to the centerline, a first and second wheels at distal ends of the forward axle, a rearward axle transverse to the centerline, and a third and fourth wheels at distal ends of the rearward axle. The system includes a jig for engagement under the vehicle, a light source attached to the jig for projecting light forward of the jig along the centerline of the vehicle when the jig is fully engaged, and a target placed on the centerline of the vehicle so as to be illuminated by the light source at a fixed distance from the vehicle.

19 Claims, 10 Drawing Sheets

(56) References Cited

FOREIGN PATENT DOCUMENTS

| | | | |
|---|---|---|---|
| CN | 209524919 U | | 10/2019 |
| CN | 110567351 A | * | 12/2019 |
| CN | 210198312 U | | 3/2020 |
| EP | 1543293 A1 | | 6/2005 |
| JP | 5363748 B2 | | 12/2013 |
| JP | 2018169330 A | | 11/2018 |
| WO | WO2004027347 A1 | | 4/2004 |
| WO | WO2019076247 A1 | | 4/2019 |
| WO | WO2019170100 A1 | | 9/2019 |

* cited by examiner

SYSTEM AND APPARATUS FOR DETERMINING A VEHICLE CENTERLINE

TECHNICAL FIELD

The embodiments disclosed herein related to the field of assembling or servicing sensing devices on a vehicle, and more specifically a system and apparatus for properly aligning the sensing devices during assembly or service.

BACKGROUND

Current tools used to properly align sensing devices on a vehicle use strings attached to tow hooks to set or align the vehicle sensing devices. However, the process can be time consuming, and the tow hooks are not always properly centered on the vehicle, thus not yielding a true vehicle centerline. Often, during service, technicians may even set the alignment by eye to save time in the process. However, not identifying the proper centerline of the vehicle may lead to the aim or alignment of sensing devices, such as cameras and radar or lidar devices, being off, limiting the effectiveness of vehicle systems that utilize them.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a system for determining a centerline of a vehicle to adjust a forward aim of a sensing device, the vehicle having a forward axle transverse to the centerline, a first wheel at a first distal end of the forward axle, a second wheel at a second distal end of the forward axle, a rearward axle transverse to the centerline, a third wheel at a first distal end of the rearward axle, and a fourth wheel at a second distal end of the rearward axle, the system includes a jig for engagement under the vehicle. The jig includes a center tube having a hollow center opening, the center tube being disposed along the centerline when the jig is fully engaged, a first longitudinal tube parallel to the center tube, a second longitudinal tube parallel to the center tube and the first longitudinal tube, a first linkage connecting the first and second longitudinal tubes to the center tube, the first linkage configured to extend the first longitudinal tube in a lateral direction to engage the first wheel and to extend the second longitudinal tube in a lateral direction opposite the first longitudinal tube to engage the second wheel, and a second linkage connecting the first and second longitudinal tubes to the center tube, the second linkage configured to extend the first longitudinal tube in a lateral direction to engage the third wheel and to extend the second longitudinal tube in a lateral direction opposite the first longitudinal tube to engage the fourth wheel.

According to another aspect, a jig for determining a centerline of a vehicle to adjust a forward aim of a sensing device, the vehicle having a forward axle transverse to the centerline, a first wheel at a first distal end of the forward axle, a second wheel at a second distal end of the forward axle, a rearward axle transverse to the centerline, a third wheel at a first distal end of the rearward axle, and a fourth wheel at a second distal end of the rearward axle, includes a center tube having a hollow center opening, the center tube being disposed along the centerline when the jig is fully engaged, a first longitudinal tube parallel to the center tube, a second longitudinal tube parallel to the center tube and the first longitudinal tube, a first linkage connecting the first and second longitudinal tubes to the center tube, the first linkage configured to extend the first longitudinal tube in a lateral direction to engage the first wheel and to extend the second longitudinal tube in a lateral direction opposite the first longitudinal tube to engage the second wheel, and a second linkage connecting the first and second longitudinal tubes to the center tube, the second linkage configured to extend the first longitudinal tube in a lateral direction to engage the third wheel and to extend the second longitudinal tube in a lateral direction opposite the first longitudinal tube to engage the fourth wheel.

According to yet another aspect, a system for determining a centerline of a vehicle to adjust a forward aim of a sensing device, the vehicle having a forward axle transverse to the centerline, a first wheel at a first distal end of the forward axle, a second wheel at a second distal end of the forward axle, a rearward axle transverse to the centerline, a third wheel at a first distal end of the rearward axle, and a fourth wheel at a second distal end of the rearward axle, includes a jig for engagement under the vehicle, a light source attached to the jig for projecting light forward of the jig along the centerline of the vehicle when the jig is fully engaged, and a target, the target being placed on the centerline of the vehicle so as to be illuminated by the light source at a fixed distance from the vehicle.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
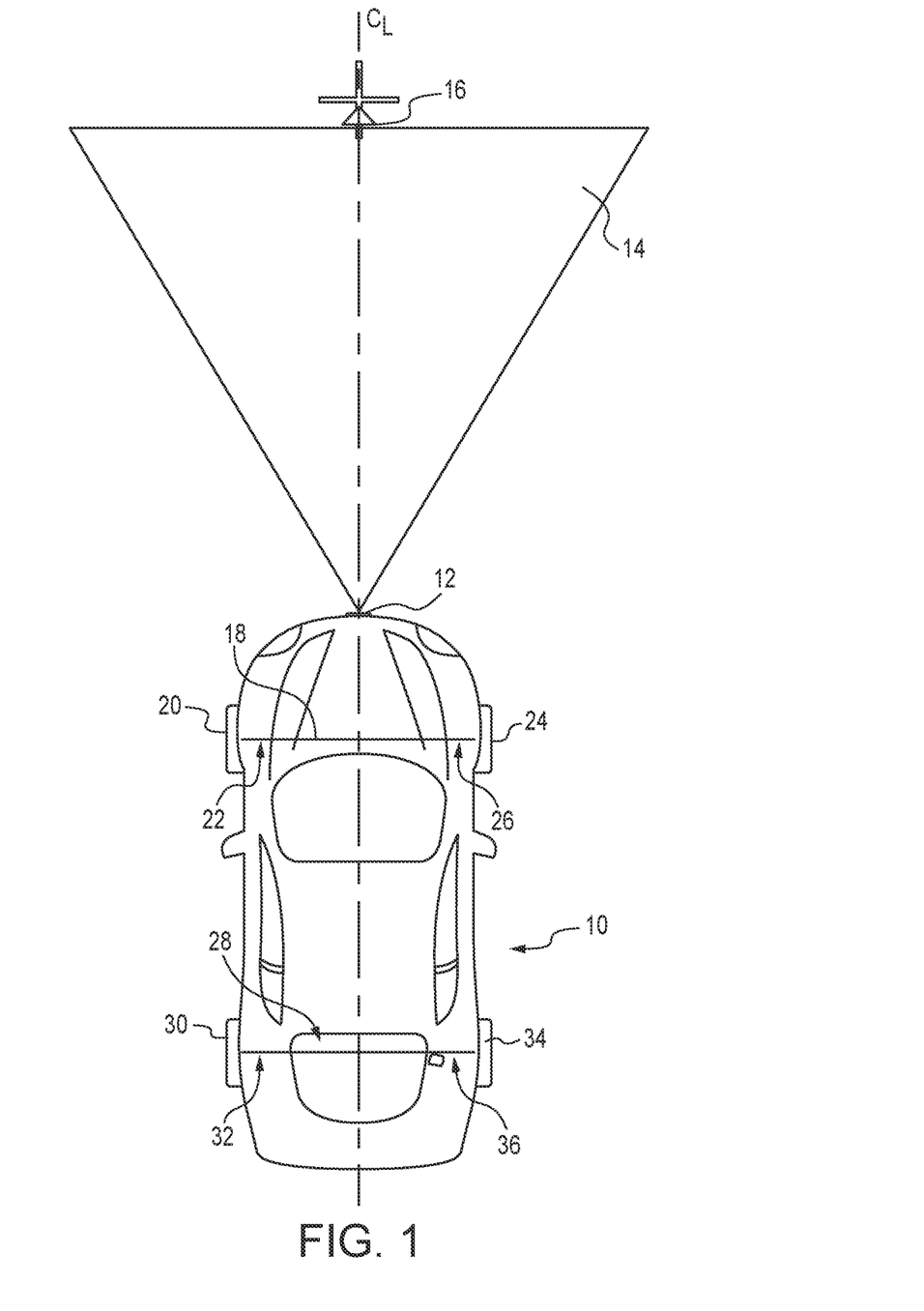
FIG. 1 is top view of a vehicle and the field of few of a forward-facing sensing device.

FIG. 1 illustrates a vehicle 10 equipped with a forward aiming sensing device 12, such as a camera or ranging unit (radar, LiDar, etc. . . . ). During the assembly process, either during the original assembly or reassembly during service, there is a need to properly orient the sensing device 12 so the field of view 14 is centered along a centerline CL of the vehicle 10, with the sensing device 12 directly facing a target 16 forward of the vehicle 10 along the centerline CL. The vehicle 10 includes a forward axle 18 transverse to the centerline CL, a first wheel 20 at a first distal end 22 of the forward axle 18, a second wheel 24 at a second distal end 26 of the forward axle 18, a rearward axle 28 transverse to the centerline CL, a third wheel 30 at a first distal end 32 of the rearward axle 28, and a fourth wheel 34 at a second distal end 36 of the rearward axle 28.

Figure 2:
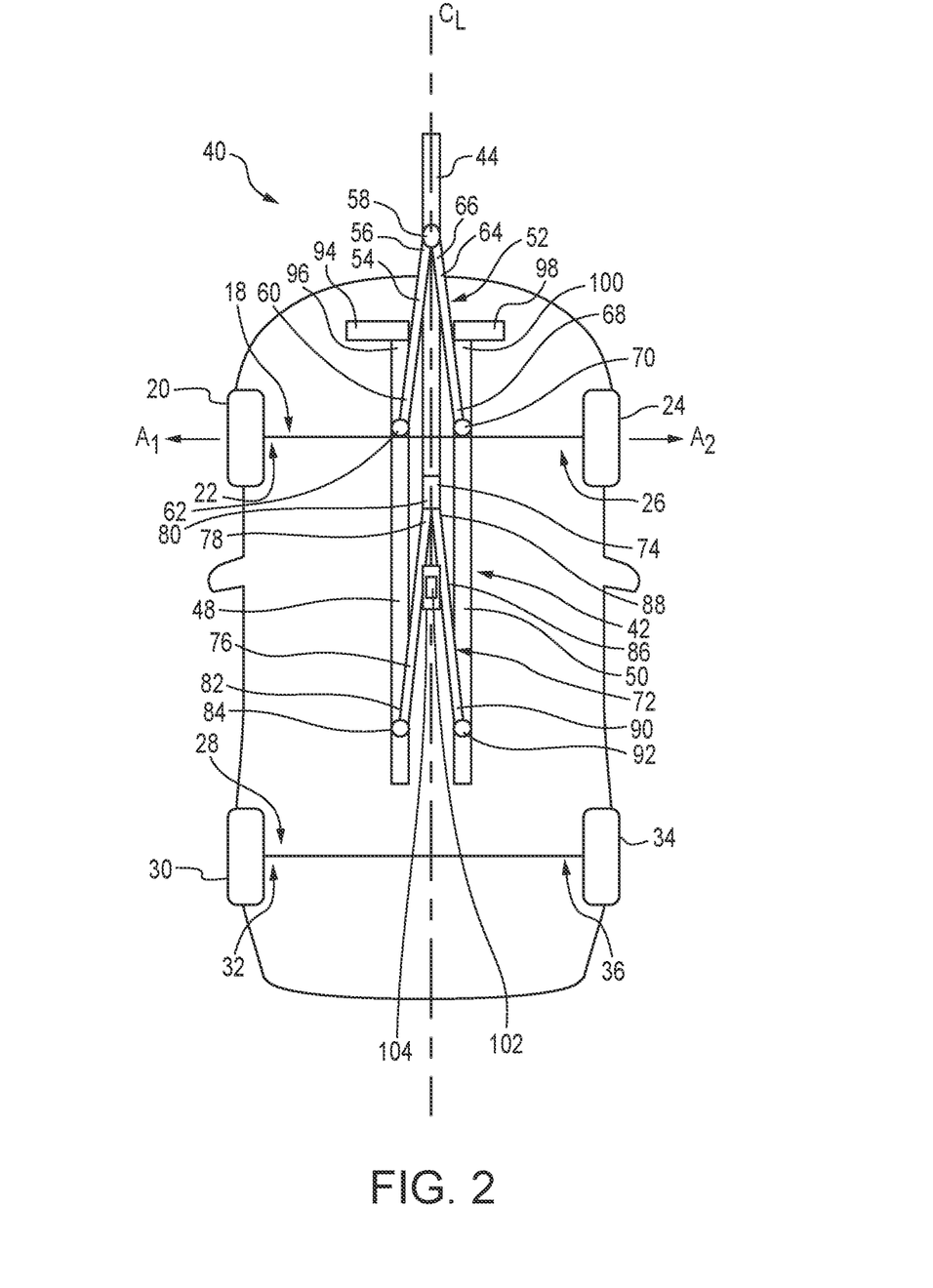
FIG. 2 is a top view of a vehicle, in shadow, with a jig in a closed position under the car for determining the centerline of the vehicle.
Figure 3:
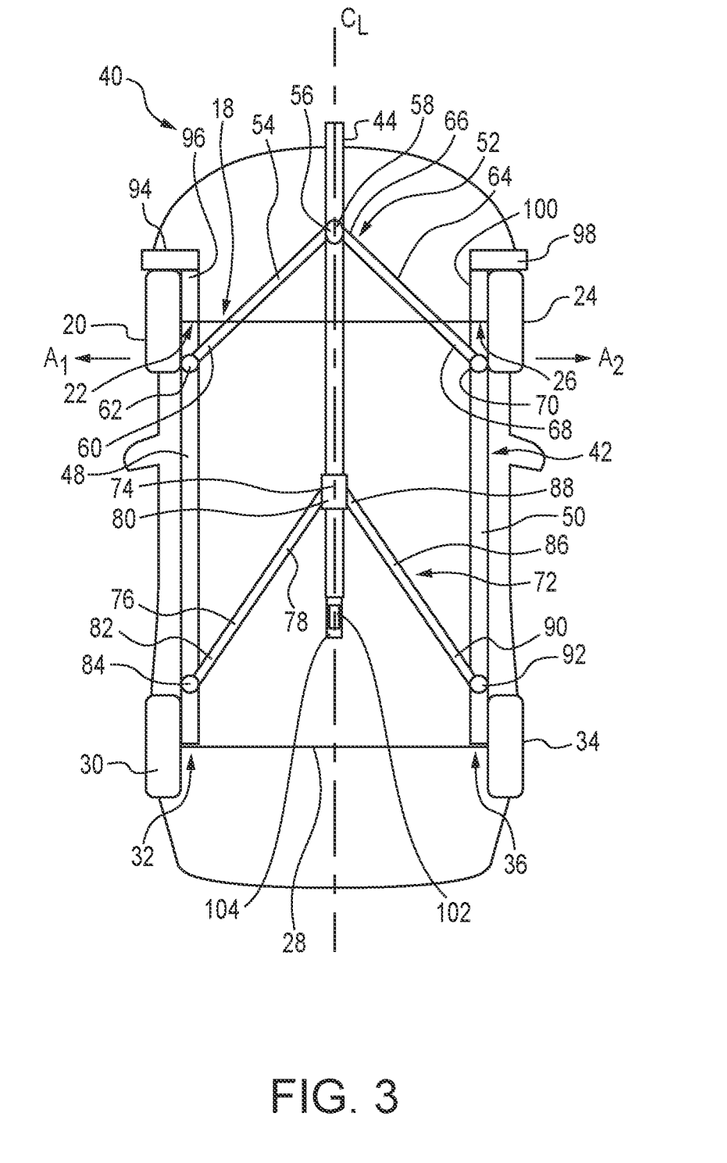
FIG. 3 is a top view of a vehicle, in shadow, with a jig in an engaged position under the car for determining the centerline of the vehicle.

FIGS. 2-13 illustrate a system 40 for orienting the sensing device 12 of the vehicle 10. FIG. 2-5 illustrates a jig 42 for engagement under the vehicle 10. The jig 42, illustrated in FIG. 2 in a retracted state for sliding under the vehicle 10, includes a center tube 44 having a hollow center opening 46, shown in FIG. 5, and disposed along the centerline CL when the jig 42 is fully engaged, as illustrated in FIG. 3.

The jig 42 also includes a first longitudinal tube 48 parallel to the center tube 44 and a second longitudinal tube 50 parallel to the center tube 44 and the first longitudinal tube 48. A first linkage 52 connects the first and second longitudinal tubes 48, 50 to the center tube 44. The first linkage 52 is configured to extend the first longitudinal tube 48 in a lateral direction, depicted by arrow $A_1$ in FIGS. 2-3, to engage the first wheel 20 and to extend the second longitudinal tube 50 in a lateral direction, depicted by arrow $A_2$, opposite the first longitudinal tube 48, to engage the second wheel 24.

The first linkage 52 includes a first transverse tube 54 that includes a first end 56 pivotally connected to the center tube 44 via pivotal hinge 58 and a second end 60 pivotally connected to the first longitudinal tube 48 via pivotal hinge 62. The first linkage 52 also includes a second transverse tube 64 having a first end 66 pivotally connected to the center tube 44 via pivotal hinge 58 adjacent the first end 56 of the first transverse tube 54 and a second end 68 pivotally connected to the second longitudinal tube 50 via pivotal hinge 70.

Figure 4:
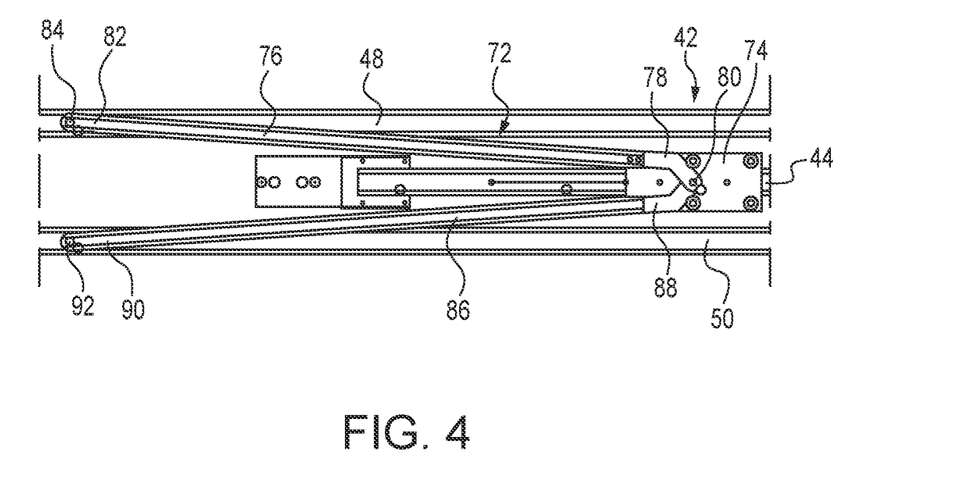
FIG. 4 is a top view of the second linkage of the jig of FIGS. 2 and 3.

A second linkage 72, illustrated in FIGS. 2-4, also connects the first and second longitudinal tubes 48, 50 to the center tube 44. The second linkage 72 is configured to also extend the first longitudinal tube 48 in a lateral direction $A_1$ to engage the third wheel 30 and to extend the second longitudinal tube 50 in a lateral direction $A_2$ opposite the first longitudinal tube 48 to engage the fourth wheel 34.

The second linkage 72 includes a sleeve 74 that is slidably disposed on the center tube 44. The second linkage 72 also includes a third transverse tube 76 having a first end 78 pivotally connected to the sleeve 74 by pivotal hinge 80 and a second end 82 pivotally connected to the first longitudinal tube 48 by pivotal hinge 84 and a fourth transverse tube 86 having a first end 88 pivotally connected to the sleeve 44 by pivotal hinge 80 and a second end 90 pivotally connected to the second longitudinal tube 50 by pivotal hinge 92.

The jig 42 further includes a first wheel engagement tube 94 extending laterally outward from a forward distal end 96 of the first longitudinal tube 48 and a second wheel engagement tube 98 extending laterally outward in a direction opposite the first wheel engagement tube 94 from a forward distal end 100 of the second longitudinal tube 50. The first and second wheel engagement tubes 94, 98 engage the first and second wheels 20, 24 respectively when the jig 42 is fully engaged as shown in FIG. 3.

Figure 5:
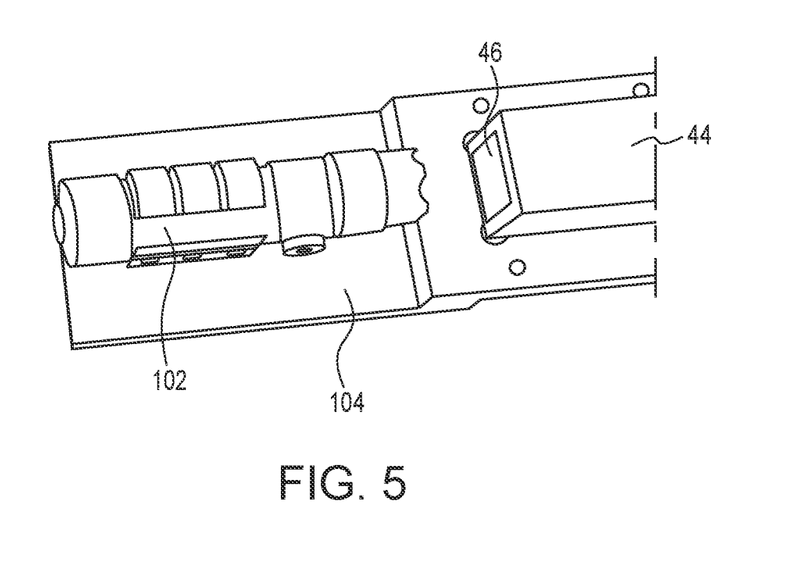
FIG. 5 is a top view of the light source of the jig of the FIGS. 2 and 3.
Figure 6:
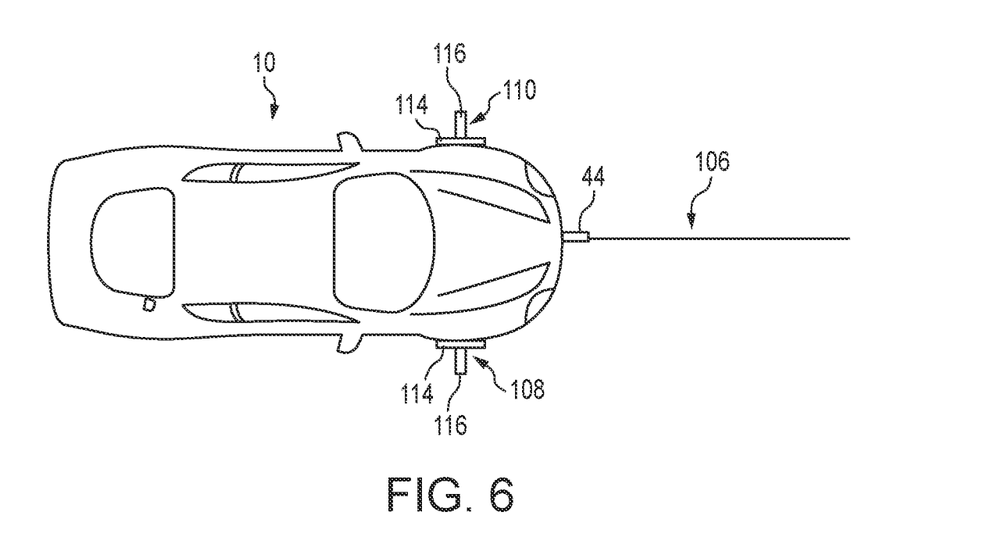
FIG. 6 is a top view of a vehicle illustrating wheel flag jigs installed.

The system 40 further includes a light source 102 attached to the center tube 44 for projecting light forward of the jig 42 along the centerline CL of the vehicle 10 when the jig 42 is fully engaged as shown in FIG. 3. The light source 102 is mounted to a platform 104 mounted to a rear distal end 106 of the hollow center tube 44 such that the light source 102 is disposed to project light 106 through the hollow center 46 of the center tube 44, as illustrated in FIG. 5, forward of the jig 42, as illustrated in FIG. 6. The light source 102 may be a laser or any other suitable source of sufficiently bright light.

The system further includes first and second wheel flag jigs 108, 110 as shown in FIG. 6. The first and second wheel flag jigs 108, 110 which are illustrated with regard to the second wheel flag jig 110, which hangs on second wheel 24 and illustrated in greater detail in FIGS. 7-9. First and second wheel flag jigs 108, 110 are identical, with first wheel flag jig 108 hanging on the first wheel 20.

Figure 7:
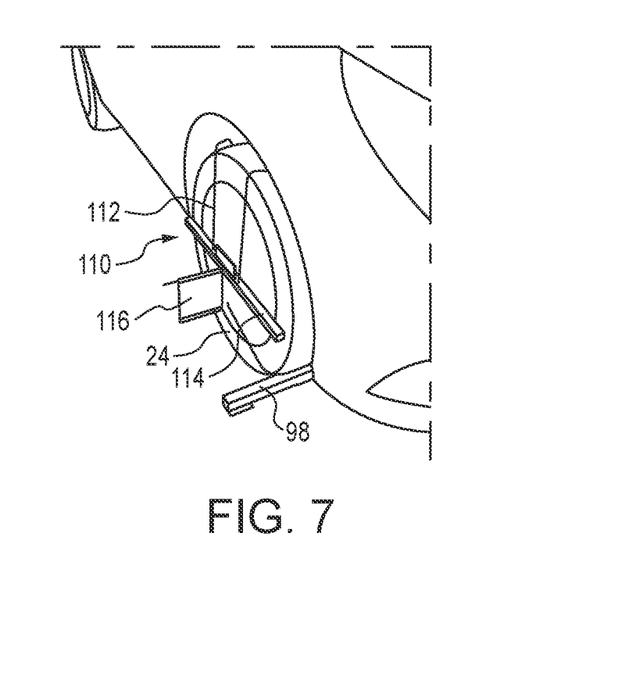
FIG. 7 is a front perspective view of a wheel flag jig of FIG. 6.
Figure 8:
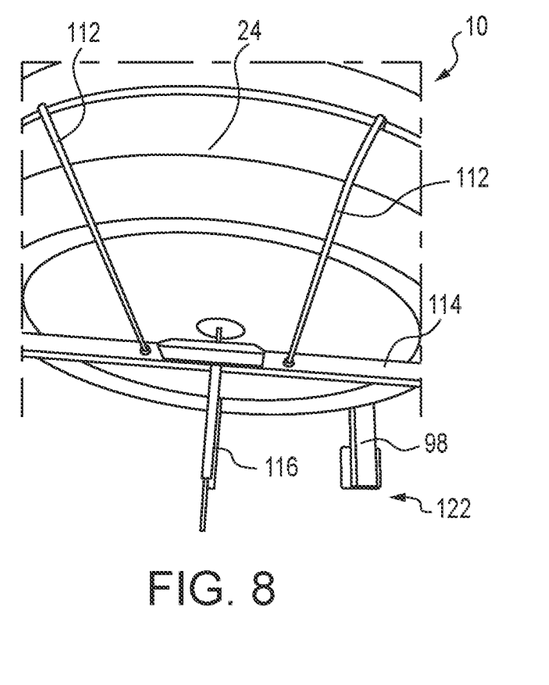
FIG. 8 is a top view of a wheel flag jig of FIG. 6.
Figure 9:
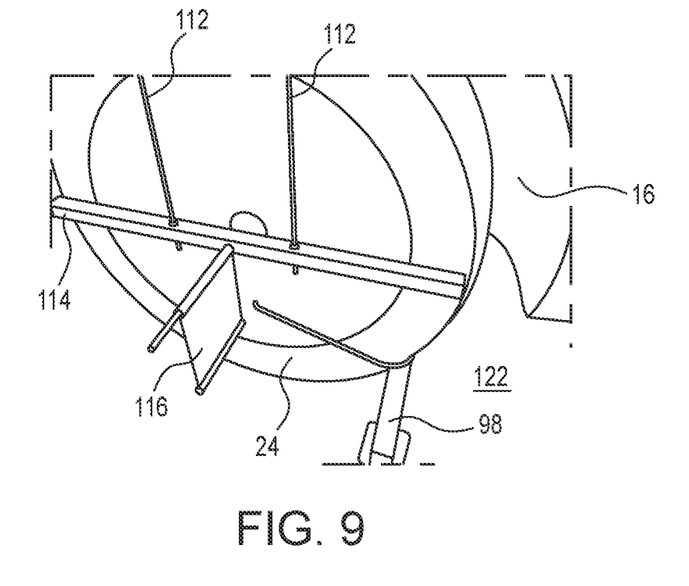
FIG. 9 is a side view of a wheel flag jig of FIG. 6.

Each of the first and second wheel flag jigs 108, 110 include a hanger 112 to hang the wheel flag jigs 108, 110 on the respective first and second wheels 20, 24. A beam 114 is affixed to the hanger 112 such that the beam is positioned perpendicular to the front axle 18. Finally, each of the first and second wheel flag jigs 108, 110 includes a flag 116 extending laterally outward from the beam 114. The flag 116 is made of a metallic surface to remain stiff and reflective and reflects a center of the respective first and second wheels 20, 24 in line with the front axle 18.

Figure 10:
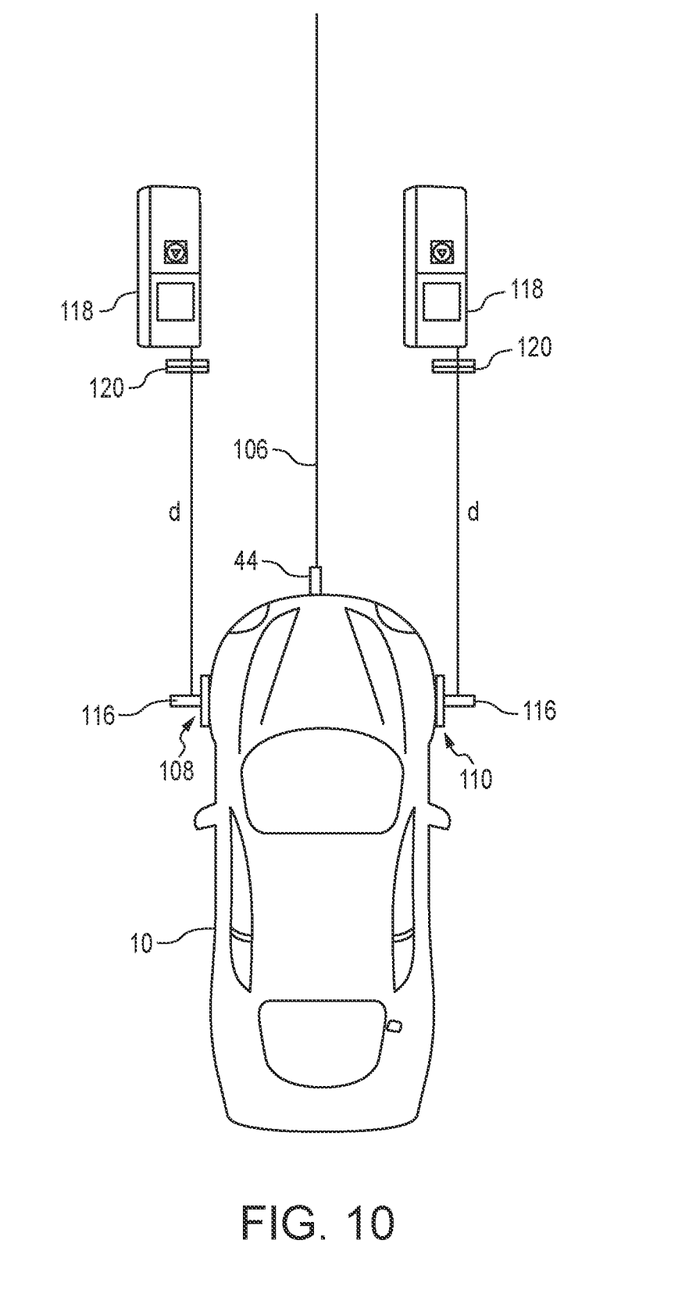
FIG. 10 illustrates a first step in the use of the wheel flag jigs in the installation of a target.

As illustrated in FIG. 10 measurements are taken using a measuring device 118 to place marks 120 at equal fixed distances d from the flag 116 of each of the first and second wheel flag jigs 108, 110 forward of the vehicle 10 on the floor 122. The measuring device 118 may be a digital laser tape measure, a mechanical tape measure, or any other suitable measurement apparatus. The distance d may be anywhere between 5-50 feet, and is determined by the size of the vehicle, the space available, and resolution of the sensing device 12.

Figure 11:
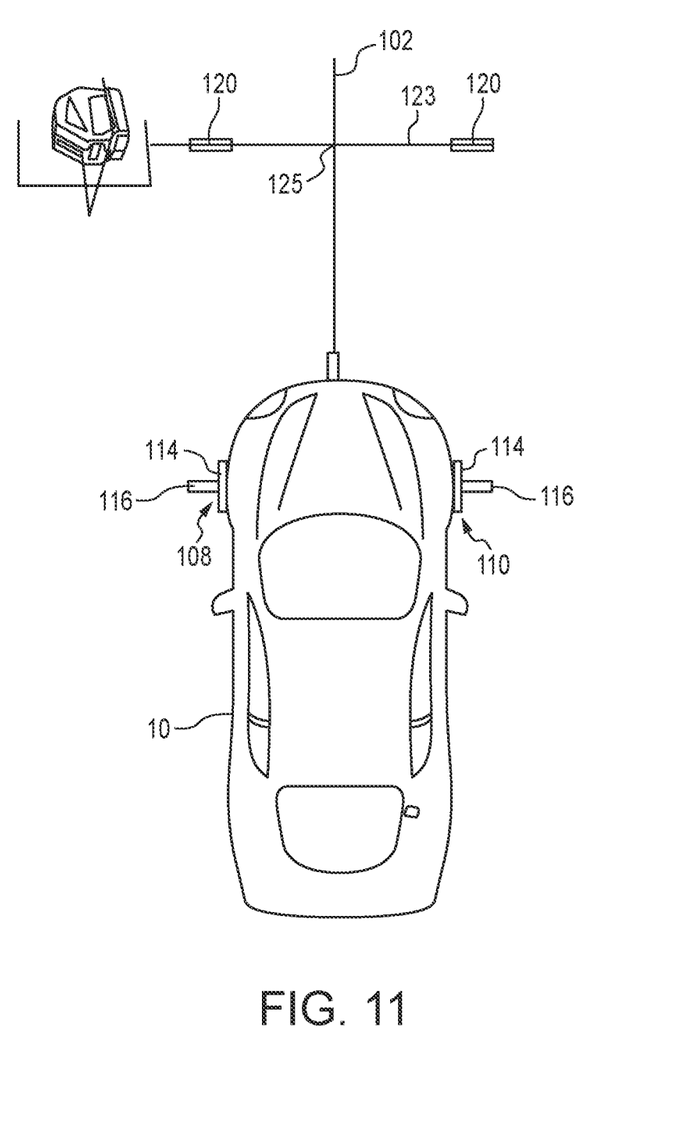
FIG. 11 illustrates a second stop in the use of the wheel flag jigs in the installation of a target.

With respect to FIG. 11, a line 123 is drawn between the marks 120 placed on the floor 122. A target 16 is placed at the halfway point between the marks 120 at the intersection 125 with the centerline CL of the vehicle 10 defined by the light 106 from the light source 102.

Figure 12:
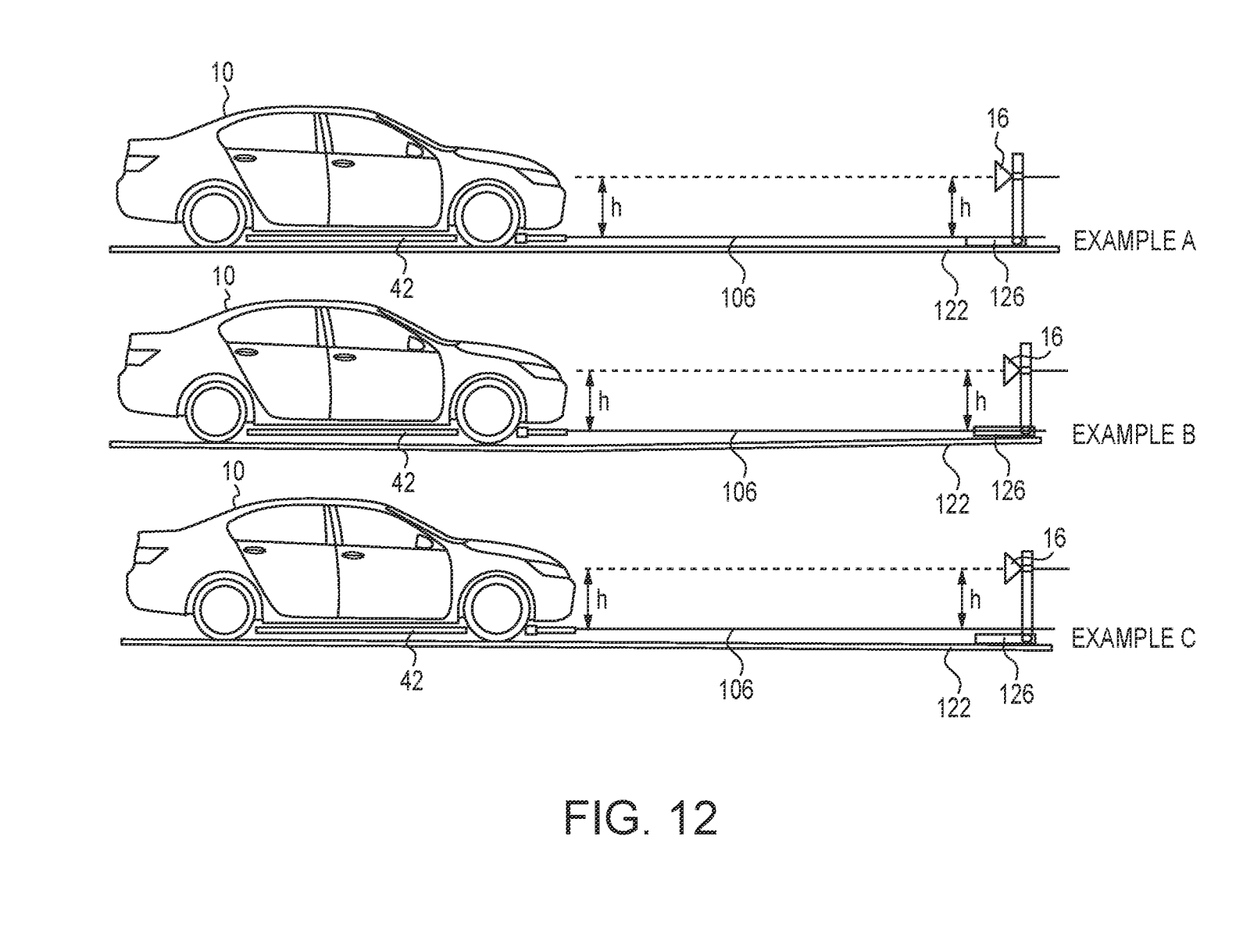
FIG. 12 illustrates adjustments to be made to the target based on the slope of the floor.
Figure 13:
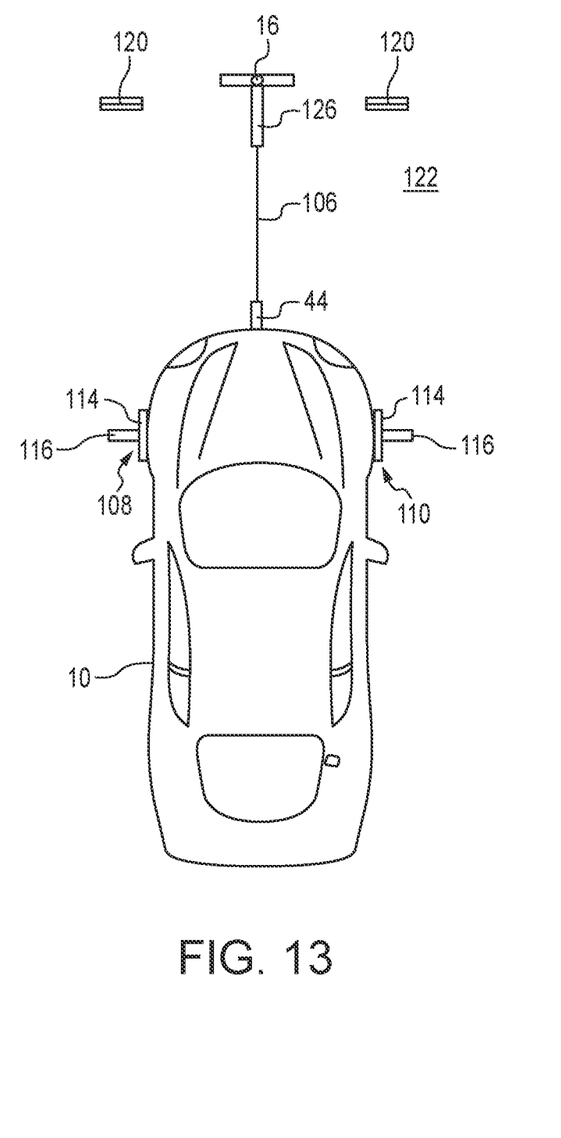
FIG. 13 illustrates use of the target along a centerline of the vehicle.

FIG. 12 illustrates that discrepancies can be avoided by setting the vertical height of the target 16 at a fixed height h above the where the light 106 from the light source 102 hits the base 126 of the target 16 that equals the difference in height h between the sensing device 12 and the light 106 from the light source 102 at the front of the vehicle 10. This may be accomplished by raising or lowering the base 126 so that the light 106 form the light source 102 always hits the base 126 in the same location. This helps to account for whether the floor 122 is level (Example A of FIG. 12), on an upslope (Example B of FIG. 12), or on a downslope (Example C of FIG. 12). FIG. 13 shows the target 16 aligned along the centerline CL such that the aim of the sensing device 12 may be adjusted.

The jig 42 may be constructed of PVC or other plastics, steel, aluminum, or other metals, or combinations thereof.

The jig 42 may further be placed on caster wheels (not shown) or other rolling devices to aid in moving the jig 42 along the floor 122.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A system for determining a centerline of a vehicle to adjust a forward aim of a sensing device, the vehicle having a forward axle transverse to the centerline, a first wheel at a first distal end of the forward axle, a second wheel at a second distal end of the forward axle, a rearward axle transverse to the centerline, a third wheel at a first distal end of the rearward axle, and a fourth wheel at a second distal end of the rearward axle, the system comprising:
   a jig for engagement under the vehicle, comprising:
      a center tube having a hollow center opening, the center tube being disposed along the centerline when the jig is fully engaged;
      a first longitudinal tube parallel to the center tube;
      a second longitudinal tube parallel to the center tube and to the first longitudinal tube;
      a first linkage connecting the first and second longitudinal tubes to the center tube, the first linkage configured to extend the first longitudinal tube in a lateral direction to engage the first wheel and to extend the second longitudinal tube in a lateral direction opposite the first longitudinal tube to engage the second wheel; and
      a second linkage connecting the first and second longitudinal tubes to the center tube, the second linkage configured to extend the first longitudinal tube in a lateral direction to engage the third wheel and to extend the second longitudinal tube in a lateral direction opposite the first longitudinal tube to engage the fourth wheel.

2. The system of claim 1 wherein the first linkage comprises:
   a first tube having a first end pivotally connected to the center tube and second end pivotally connected to the first longitudinal tube; and
   a second transverse tube having a first end pivotally connected to the center tube adjacent the first end of the first transverse tube and a second end pivotally connected to the second longitudinal tube.

3. The system of claim 2 wherein the second linkage comprises:
   a sleeve that is slidably disposed on the center tube;
   a third transverse tube having a first end pivotally connected to the sleeve and a second end pivotally connected to the first longitudinal tube; and
   a fourth transverse tube having a first end pivotally connected to the sleeve and a second end pivotally connected to the second longitudinal tube.

4. The system of claim 3 wherein the jig further comprises:
   a first wheel engagement tube extending laterally outward from a forward distal end of the first longitudinal tube; and
   a second wheel engagement tube extending laterally outward in a direction opposite the first wheel engagement tube from a forward distal end of the second longitudinal tube.

5. The system of claim 4 further comprising:
   a light source attached to the center tube for projecting light forward of the jig along the centerline of the vehicle when the jig is fully engaged.

6. The system of claim 5 wherein the jig further comprises:
   a platform mounted to a rear distal end of the hollow center tube; and
   wherein the light source is attached to the platform and disposed to project light through the hollow center tube forward of the jig.

7. The system of claim 6 wherein the light source is a laser.

8. The system of claim 7 wherein further comprising:
   a first wheel flag jig, comprising:
      a first hanger to hang the first wheel flag jig on the first wheel;
      a first beam affixed to the first hanger, the first beam being positioned perpendicular to the front axle; and
      a first flag extending laterally outward from the first beam; and
   a second wheel flag jig, comprising:
      a second hanger to hang the second wheel flag jig on the second wheel;
      a second beam affixed to the second hanger, the second beam being positioned perpendicular to the front axle; and
      a second flag extending laterally outward from the second beam.

9. The system of claim 8 further comprising:
   a target, the target being placed on the centerline of the vehicle so as to be illuminated by the light source at a fixed distance from the vehicle, the fixed distance being measured from the first and second flags.

10. A jig for determining a centerline of a vehicle to adjust a forward aim of a sensing device, the vehicle having a forward axle transverse to the centerline, a first wheel at a first distal end of the forward axle, a second wheel at a second distal end of the forward axle, a rearward axle transverse to the centerline, a third wheel at a first distal end of the rearward axle, and a fourth wheel at a second distal end of the rearward axle, the jig comprising:
   a center tube having a hollow center opening, the center tube being disposed along the centerline when the jig is fully engaged;
   a first longitudinal tube parallel to the center tube;
   a second longitudinal tube parallel to the center tube and the first longitudinal tube;
   a first linkage connecting the first and second longitudinal tubes to the center tube, the first linkage configured to extend the first longitudinal tube in a lateral direction to engage the first wheel and to extend the second longitudinal tube in a lateral direction opposite the first longitudinal tube to engage the second wheel; and a second linkage connecting the first and second longitudinal tubes to the center tube, the second linkage configured to extend the first longitudinal tube in a lateral direction to engage the third wheel and to extend the second longitudinal tube in a lateral direction opposite the first longitudinal tube to engage the fourth wheel.

11. The jig of claim 10 wherein the first linkage comprises:
a first transverse tube having a first end pivotally connected to the center tube and second end pivotally connected to the first longitudinal tube; and
a second transverse tube having a first end pivotally connected to the center tube adjacent the first end of the first transverse tube and a second end pivotally connected to the second longitudinal tube.

12. The jig of claim 11 wherein the second linkage comprises:
a sleeve that is slidably disposed on the center tube;
a third transverse tube having a first end pivotally connected to the sleeve and a second end pivotally connected to the first longitudinal tube; and
a fourth transverse tube having a first end pivotally connected to the sleeve and a second end pivotally connected to the second longitudinal tube.

13. The jig of claim 12 further comprising:
a first wheel engagement tube extending laterally outward from a forward distal end of the first longitudinal tube; and
a second wheel engagement tube extending laterally outward in a direction opposite the first wheel engagement tube from a forward distal end of the second longitudinal tube.

14. The jig of claim 13 further comprising:
a light source attached to the center tube for projecting light forward of the jig along the centerline of the vehicle when the jig is fully engaged.

15. The jig of claim 14 further comprising:
a platform mounted to a rear distal end of the hollow center tube; and
wherein the light source is attached to the platform and disposed to project light through the hollow center tube forward of the jig.

16. The jig of claim 14 wherein the light source is a laser.

17. A system for determining a centerline of a vehicle to adjust a forward aim of a sensing device, the vehicle having a forward axle transverse to the centerline, a first wheel at a first distal end of the forward axle, a second wheel at a second distal end of the forward axle, a rearward axle transverse to the centerline, a third wheel at a first distal end of the rearward axle, and a fourth wheel at a second distal end of the rearward axle, the system comprising:
a jig for engagement under the vehicle, comprising:
a center tube having a hollow center opening, the center tube being disposed along the centerline when the jig is fully engaged;
a first longitudinal tube parallel to the center tube;
a second longitudinal tube parallel to the center tube and the first longitudinal tube;
a first linkage connecting the first and second longitudinal tubes to the center tube, the first linkage configured to extend the first longitudinal tube in a lateral direction to engage the first wheel and to extend the second longitudinal tube in a lateral direction opposite the first longitudinal tube to engage the second wheel; and
a second linkage connecting the first and second longitudinal tubes to the center tube, the second linkage configured to extend the first longitudinal tube in a lateral direction to engage the third wheel and to extend the second longitudinal tube in a lateral direction opposite the first longitudinal tube to engage the fourth wheel;
a light source attached to the jig for projecting light forward of the jig along the centerline of the vehicle when the jig is fully engaged; and
a target, the target being placed on the centerline of the vehicle so as to be illuminated by the light source at a fixed distance from the vehicle.

18. The system of claim 17 wherein:
the first linkage comprises:
a first tube having a first end pivotally connected to the center tube and second end pivotally connected to the first longitudinal tube; and
a second transverse tube having a first end pivotally connected to the center tube adjacent the first end of the first transverse tube and a second end pivotally connected to the second longitudinal tube;
the second linkage comprises:
a sleeve that is slidably disposed on the center tube;
a third transverse tube having a first end pivotally connected to the sleeve and a second end pivotally connected to the first longitudinal tube; and
a fourth transverse tube having a first end pivotally connected to the sleeve and a second end pivotally connected to the second longitudinal tube; and
the jig further comprises:
a first wheel engagement tube extending laterally outward from a forward distal end of the first longitudinal tube; and
a second wheel engagement tube extending laterally outward in a direction opposite the first wheel engagement tube from a forward distal end of the second longitudinal tube.

19. The system of claim 17 wherein the light source is a laser.

* * * * *